United States Patent
Ben-Harrush et al.

(10) Patent No.: US 10,834,213 B2
(45) Date of Patent: Nov. 10, 2020

(54) SYSTEM AND METHOD FOR MEASURING USER ENGAGEMENT

(71) Applicant: International Business Machines Corporation, Armonk, NY (US)

(72) Inventors: Idan Ben-Harrush, Givat Elah (IL); Nili Ifergan-Guy, Haifa (IL); Lior Turgeman, Moreshet (IL)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 15/654,973

(22) Filed: Jul. 20, 2017

(65) Prior Publication Data

US 2019/0028556 A1    Jan. 24, 2019

(51) Int. Cl.
    H04L 29/08    (2006.01)
    H04L 29/06    (2006.01)
    G06F 16/951   (2019.01)
    G06Q 30/02    (2012.01)

(52) U.S. Cl.
    CPC .......... H04L 67/22 (2013.01); G06F 16/951 (2019.01); G06Q 30/02 (2013.01); H04L 67/025 (2013.01); H04L 67/306 (2013.01); H04L 69/28 (2013.01)

(58) Field of Classification Search
    None
    See application file for complete search history.

(56) References Cited

U.S. PATENT DOCUMENTS

| | | | | |
|---|---|---|---|---|
| 8,560,489 B2 * | 10/2013 | Kaufman | ............... | G06N 7/005 |
| | | | | 706/52 |
| 2007/0244739 A1 * | 10/2007 | Soito | ..................... | G06Q 30/02 |
| | | | | 705/7.29 |
| 2012/0078838 A1 | 3/2012 | Kaufman et al. | | |
| 2015/0088955 A1 | 3/2015 | Hendrick et al. | | |
| 2015/0249716 A1 | 9/2015 | Chen et al. | | |
| 2015/0363289 A1 * | 12/2015 | Brough | ................. | H04W 24/10 |
| | | | | 709/224 |

(Continued)

OTHER PUBLICATIONS

Lehmann et al., "Models of user engagement." International Conference on User Modeling, Adaptation, and Personalization . Springer Berlin Heidelberg, 2012.

(Continued)

*Primary Examiner* — Gregory J Toatley, Jr.
*Assistant Examiner* — Terence E Stifter, Jr.
(74) *Attorney, Agent, or Firm* — Roy S. Melzer (57) ABSTRACT

A system for monitoring user engagement, comprising at least one hardware processor, configured to: receive from a plurality of sensors information about a sequence of interactions of a user with a software application during a time interval, the information comprising, for each of the sequence of interactions, a plurality of sensor output values of a plurality of engagement metrics reflecting the user's emotional attachment to the software application; compute a sequence of linearly uncorrelated principle components based on an outcome of principal component analysis (PCA) of the plurality of sensor output values of the plurality of engagement metrics; and select a first component from the sequence of linearly uncorrelated principle components to be a user engagement index representing engagement of the user with the application during the time interval according to the plurality of engagement metrics.

17 Claims, 6 Drawing Sheets

(56) References Cited

U.S. PATENT DOCUMENTS

2016/0352848 A1* 12/2016 Lin ................... G06F 11/3013

OTHER PUBLICATIONS

O'Brien et al., "What is user engagement? A conceptual framework for defining user engagement with technology." Journal of the American Society for Information Science and Technology 59.6 (2008): 938-955.

Kim et al., "A study of mobile user engagement (MoEN): Engagement motivations, perceived value, satisfaction, and continued engagement intention." Decision Support Systems 56 (2013): 361-370.

* cited by examiner

SYSTEM AND METHOD FOR MEASURING USER ENGAGEMENT

BACKGROUND

The present invention, in some embodiments thereof, relates to a system and method for measuring user engagement and, more specifically, but not exclusively, to a measuring user engagement with a software application on a mobile device.

User engagement is a state characterized by energy, involvement and efficiency, and is conceptually described as a behavioral flow without any intentional mindset. Typically, user engagement with a software application is characterized by a plurality of time dependent metrics reflecting a user's emotional attachment to the software application.

Henceforth, the term "application" is used to mean "software application".

Affectively-driven behavior is behavior driven by a person's feelings. Cognitively-driven behavior is behavior driven by a person's beliefs and knowledge. Metrics reflecting a user's emotional attachment to the application may be cognitively-driven and affectively-driven, and are typically measured during one or more predefined time intervals. Examples of such metrics are: how many time the application has been downloaded to a device that can execute it, how many times the application has been opened by the user, how much time the user spent using the application per visit (dwell time), an average amount of user operations, for example clicks, per visit, how many times the user downloads the application after deleting it and an amount of days the application has been used.

Different applications differ widely in terms of their engagement. Some applications are downloaded by thousands of users (for example, news applications), whereas other applications are downloaded by a small group of users (for example, an organization specific internal application). Educational applications tend to have a much shorter dwell time than applications related to entertainment (for example games). Users typically return to communication applications, such as instant messaging applications and electronic mail applications, more regularly than to applications containing information regarding a temporary interest, such as house selling.

SUMMARY

It is an object of the present invention to provide a system and method for measuring user engagement, specifically but not exclusively, measuring user engagement with a software application on a mobile device.

The foregoing and other objects are achieved by the features of the independent claims. Further implementation forms are apparent from the dependent claims, the description and the figures.

According to a first aspect of the invention, a system for monitoring user engagement comprises at least one hardware processor, configured to: receive from a plurality of sensors information about a sequence of interactions of a user with a software application during a time interval, the information comprising, for each of the sequence of interactions, a plurality of sensor output values of a plurality of engagement metrics reflecting the user's emotional attachment to the software application; compute a sequence of linearly uncorrelated principle components based on an outcome of principal component analysis (PCA) of the plurality of sensor output values of the plurality of engagement metrics; and select a first component from the sequence of linearly uncorrelated principle components to be a user engagement index representing engagement of the user with the application during the time interval according to the plurality of engagement metrics.

According to a second aspect of the invention, a method for estimating user engagement comprises: receiving from a plurality of sensors information about a sequence of interactions of a user with a software application during a time interval, the information comprising, for each of the sequence of interactions, a plurality of sensor output values of a plurality of engagement metrics reflecting the user's emotional attachment to the software application; computing a sequence of linearly uncorrelated principle components based on an outcome of PCA of the plurality of sensor output values of the plurality of engagement metrics; and selecting a first component from the sequence of linearly uncorrelated principle components to be a user engagement index representing engagement of the user with the application during the time interval according to the plurality of engagement metrics.

With reference to the first and second aspects, in a first possible implementation of the first and second aspects of the present invention, each of the plurality of interactions is associated with a time. The at least one hardware processor is configured to compute the plurality of linearly uncorrelated principle components by: producing a standardized matrix of the plurality of sensor output values from all of the plurality of interactions; computing a correlation matrix for the standardized matrix; computing a spectral decomposition of the correlation matrix producing an eigenvector matrix and an eigenvalue matrix, such that the correlation matrix equals a product of the eigenvector matrix with a diagonal matrix consisting of a plurality of eigenvalues of the eigenvalue matrix in descending order of value and an inverse matrix of the eigenvector matrix; and producing the sequence of linearly uncorrelated principle components by computing for each eigenvector in the eigenvector matrix a linear combination of a plurality of metric coefficients, by multiplying the inverse of the eigenvector by the standardized matrix. The at least one hardware processor is configured to select the user engagement index by: identifying in the sequence of principal components the first component; computing an error term by subtracting a product of a first eigenvector of the eigenvector matrix and the first component from the standardized matrix; and outputting the first component and the error term. Optionally, producing a standardized matrix comprises: partitioning by engagement metric all of the plurality of sensor output values from all of the sequence of interactions to produce a plurality of time series, by producing for each metric of the plurality of engagement metrics a sequence of sensor output values of the metric in ascending time associated with the sequence of interactions; producing a plurality of standardized time series by standardizing each of the plurality of time series to a zero mean and unit standard deviation; and producing a standardized matrix composed of the plurality of standardized time series, such that each of the standardized time series is a row of the standardized matrix. Optionally, the plurality of engagement metrics comprises a member selected from a group consisting of: an amount of application downloads, an amount of application opened by a user, an amount of time a user spent on an application in a visit, an amount of user operations in a visit, an amount of application downloads after application removal and an amount of days an application is used. Optionally, the user operations include a click on a location of an application's user interface. Using time series reduces the effect of temporary peaks and lows in user engagement.

With reference to the first and second aspects, in a second possible implementation of the first and second aspects of the present invention, the at least one hardware processor is further configured to: receive from the plurality of sensors new information about a new interaction of the user with the software application, the new information comprising a plurality of new sensor output values of the plurality of engagement metrics; select from the information and the new information a new sequence of interactions associated with a predefined recent time interval; compute a new sequence of linearly uncorrelated principle components based on an outcome of PCA of the plurality of sensor output values of the plurality of engagement metrics in the new sequence of interactions; and select a new first component from the new sequence of linearly uncorrelated principle components to be a new user engagement index. Computing a new user engagement index over time allows identifying changes in user engagement over time.

With reference to the first and second aspects, or the first possible implementation of the present invention, in a third possible implementation of the first and second aspects of the present invention, the at least one hardware processor is further configured to determine a trend using an identified amount of time by: selecting from the sequence of interactions a plurality of sets of interactions, each of the sets consisting of a consecutive sequence of interactions associated with a window of time within the time interval, the window of time having a length of the identified amount of time; computing a plurality of window user engagement indexes, comprising for each set of the sets of interactions: computing a sequence of linearly uncorrelated window principle components based on an outcome of PCA of the plurality of sensor output values of the plurality of engagement metrics in the set of interactions; and selecting a first component from the sequence of linearly uncorrelated window principle components to be a window user engagement index; producing a plurality of sets of metric coefficients, comprising for each of the window user engagement indexes the window user engagement index's plurality of metric coefficients; analyzing the plurality of sets of metric coefficients to identify a trend; and outputting the identified trend. Optionally, the at least one hardware processor is further configured to store the plurality of window user engagement indexes in a non-volatile digital storage connected to the at least one hardware processor. Computing a plurality of window user engagement indexes using a sliding window of time, where there is an overlap in the data used for the different windows, allows identifying a trend in changes to the metric coefficients comprising each of the window user engagement indexes.

With reference to the first and second aspects, or the first or third possible implementations of the present invention, in a fourth possible implementation of the first and second aspects of the present invention, the at least one hardware processor is further configured to: determine lack of a descending trend, subject to the identified trend failing to comply with a predefined test; select a new identified amount of time, the new identified amount of time less than the identified amount of time and no less than a predefined cutoff amount of time; and determine a new trend using the new identified amount of time.

With reference to the first and second aspects, in a fifth possible implementation of the present invention the plurality of sensors comprises at least one software object executed by the at least one hardware processor. Optionally, at least one object of the at least one software object is executed in the device executing the application, and the at least one object comprises one or more counters for counting some of the plurality of engagement metrics. Some useful engagement metrics are counted on the device executing the application, for example an amount of clicks and a number of application usages.

With reference to the first and second aspects, in a sixth possible implementation of the present invention the user downloads the software application to a device from an application server comprising at least one other hardware processor and the plurality of sensors comprises at least one software object executed by the application server. Optionally, at least one object of the at least one software object comprises one or more counters for counting some of the plurality of engagement metrics. Some useful engagement metrics are counted on the application server, for example an amount of downloads of the application.

With reference to the first and second aspects, in a seventh possible implementation of the present invention the at least one hardware processor is a server or a virtual machine. Using a server or a virtual machine allows using one server of virtual machine to monitor user engagement of a plurality of users or monitor user engagement of a user using a plurality of devices.

With reference to the first and second aspects, in an eighth possible implementation of the present invention the at least one hardware processor is a client device executing the application. Monitoring user engagement using the client device executing the application is simple to implement as no data communication networks are required.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to a system and method for measuring user engagement and, more specifically, but not exclusively, to a measuring user engagement with a software application on a mobile device.

In the context of software applications, and particularly, but not exclusively, mobile software applications, a successful application is not just being used, but users are engaged with. In this context, user engagement is a quality of user experience that emphasizes positive aspects of interaction with the application, and particularly phenomena associated with being captivated by features included in the application, motivating a user to use the application. Behavioral science studies support the existence of relationship between attitudes and their formation, and use this relationship to explain various behaviors and predict future intention and behavior. In the context of software applications, and particularly mobile software applications, measure user engagement can provide insights to further explain user behavior, allowing application developers to understand how users utilize their applications and what drives user engagement with the applications.

Existing methods for estimating user engagement apply machine learning techniques to estimate specific elements, for example popularity (by measuring an amount of installations), loyalty (by measuring an amount of time the application is used after an alternative becomes available) and activity (by measuring frequency of use and amount of clicks in one visit). However, the difference in terms of engagement for different applications makes it difficult to apply a common model with a common set of characteristics when measuring user engagement with different applications. In addition, when measuring user engagement using a plurality of engagement metrics, some of the engagement metrics may be related to each other, and some values measured for one metric may have a correlation with other values measured for another metric. For example, an amount of application downloads may have a correlation with an amount of skipped advertisements (a user frequently skipping advertisements in the application may be less inclined to download the application again).

The present invention, in some embodiments thereof, proposes a general metric, extracted by applying principal component analysis (PCA) to a matrix comprising a time series of measurements of a plurality of user engagement metrics.

The term "time series" is used henceforth to mean "a sequence of values ordered by time, such that one value in the series is associated with an earlier time than another time associated with another value following in the sequence".

For a predefined set of user engagement metrics, repeatedly measured over a predefined time interval, the present invention, in some embodiments thereof, transforms a time series of values measured for the predefined set of user engagement metrics into a time series of linearly uncorrelated values called principal components, using PCA. This transformation is defined such that the first principal component in the time series or principal components accounts for the largest variance as possible in the time series of values, and each succeeding principal component has the highest variance possible under the constraint that it is uncorrelated (orthogonal) to the preceding components. Applying PCA to a matrix, comprising for each of a plurality of user engagement metrics a time series of values measured for the metric, produces a time series of principal components such that the value of each principal component is a weighted sum (or a linear combination) of the plurality of metric values, having a plurality of metric coefficients. According to PCA, the variance in the plurality of values in each metric's time series contributes to the weights comprising each principal component. Typically, different users have different sets of linear combination weights, and thus a plurality of weights used in computing a plurality of principal components for one user are different than another plurality of weights used in computing another plurality of principal components for a different user.

The present invention, in some embodiments thereof, identifies the first principal component in the time series of principal components, calculated to account for the greatest possible variance in the time series of values, and uses the first principal component as a metric of the user's engagement with the application.

Using PCA allows a machine (a hardware processor executing code) to determine the weights to apply to each metric for each user, without the need to explicitly differentiate between types of applications or types of users. In addition, using one principal component as a single metric of user engagement with an application simplifies engagement analysis, reducing computation complexity and cost (typically leading to reduced power consumption).

User engagement with an application typically effects revenue associated with the application, for example by purchase of the application and advertisements. A decrease in user engagement with an application may lead to decreased revenue for the application provider or developer. In some embodiments of the present invention, a plurality of estimates is computed using a sliding time window, and is analyzed to identify a decreasing trend in the plurality of coefficients of the first principal component. Identification of a decreasing trend in a user's engagement with an application may be used by application providers and developers to identify a need to change the application in order to preserve user engagement. The current invention, in some embodiments thereof, enables a machine to identify a trend in a user's engagement with an application, which is a general direction in which the user's engagement with the application is developing or changing, without the need to explicitly differentiate between types of applications or types of users.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An eigenvector $\gamma$ of a linear transformation $\Gamma$ is a non-zero vector that, when $\Gamma$ is applied to it (that is, when $\gamma$ is multiplied by $\Gamma$), does not change direction. Applying $\Gamma$ to eigenvector $\gamma$ only scales eigenvector $\gamma$ by a scalar value $\lambda$, called an eigenvalue.

In some embodiments of the present invention, a plurality of user engagement metrics is collected by one or more sensors measuring a user's engagement with an application. The amount of metrics in the plurality of metrics is depicted by N. Over a predefined period of time, for each metric of the N metrics a time series of values may be collected. The amount of values collected for each metric is depicted by T.

For each metric i, $Y_{i,t}$ depicts a time series of values for metric i, standardized to zero mean and unit standard deviation.

A plurality of N time series is arranged in a matrix, depicted by $Y_t$, having N rows, where each row is a time series $Y_{i,t}$ of T values for one of the plurality of metrics measured for the user with the application. Optionally, a correlation matrix A is computed for $Y_t$, depicting correlations between the measured values. According to PCA theory, the principal components of $Y_t$ can be computed from the plurality of eigenvectors of A.

Correlation matrix A is optionally decomposed into a diagonal matrix and an orthonormal matrix (spectral decomposition). $\Lambda$ depicts the diagonal matrix, such that a plurality of eigenvalues depicted by $\lambda_1, \lambda_2, \lambda_3 \ldots \lambda_N$ form the diagonal of $\Lambda$ (that is $\Lambda=\text{diag}(\lambda_1, \lambda_2, \lambda_3 \ldots \lambda_N)$) and $\lambda_1 \geq \lambda_2 \geq \lambda_3 \geq \ldots \geq \lambda_N$. $\Gamma^{-1}$ depicts an orthonormal matrix whose $i^{th}$ column forms the eigenvector basis $\gamma_i$ of A. $\Gamma^{-1}$ depicts the inverse matrix of $\Gamma$, such that $A \equiv \Gamma \Lambda \Gamma^{-1}$. The plurality of eigenvectors depicted by $\gamma_1, \gamma_2 \ldots \gamma_N$ are the plurality of eigenvector of A.

For each of the plurality of eigenvalues $\lambda_i$ and the matching eigenvector $\gamma_i$ of the plurality of eigenvectors, according to PCA theory:

$$\lambda_i = \gamma_i^{-1} A \gamma_i = \gamma_i^{-1} \text{Cov}(Y_t) \gamma_i = \text{var}(\gamma_i^{-1} Y_t)$$

According to PCA theory, the $i^{th}$ principal component $\alpha_{i,t}$ is defined as the linear combination $\alpha_{i,t} = \gamma_i^{-1} Y_t$.

According to PCA theory, $\lambda_i$ represents the total variance of values in $Y_t$ contributed to $\alpha_{i,t}$.

In traditional PCA in which the data is unordered, the resulting principal components are unordered. When using the present invention in some embodiments thereof for analyzing a plurality of time series, in which the values are ordered by time, the resulting plurality of principal components are a sequence in time, i.e. the resulting plurality of principal components is also a time series.

According to the orthonormal property of $\Gamma$, multiplying $\Gamma$ by its inverse matrix $\Gamma^{-1}$ produces the identity matrix I. Thus:

$$I = \Gamma \Gamma^{-1} = \gamma_1 \gamma_1^{-1} + \ldots + \gamma_N \gamma_N^{-1}$$

Now, the matrix $Y_t$ of the plurality of time series can be represented as a linear combination of its plurality of principal components:

$$Y_t = IY_t = (\gamma_1 \gamma_1^{-1} + \gamma_2 \gamma_2^{-1} + \ldots + \gamma_N \gamma_N^{-1}) Y_t = \gamma_1 \alpha_{1,t} + \gamma_2 \alpha_{2,t} + \ldots + \gamma_N \alpha_{N,t}$$

Typically, a user is characterized by a first eigenvalue $\text{var}(\alpha_{1,t}) = \lambda_1$ significantly larger than the other of the plurality of eigenvalues, allowing a simplified expression of $Y_t$ as a sum of a term corresponding to $\alpha_{1,t}$ and an error term, depicted by err, combining all other terms corresponding to the other of the plurality of principal components:

$$Y_t = \gamma_1 \alpha_{1,t} + \text{err}$$

Figure 1:
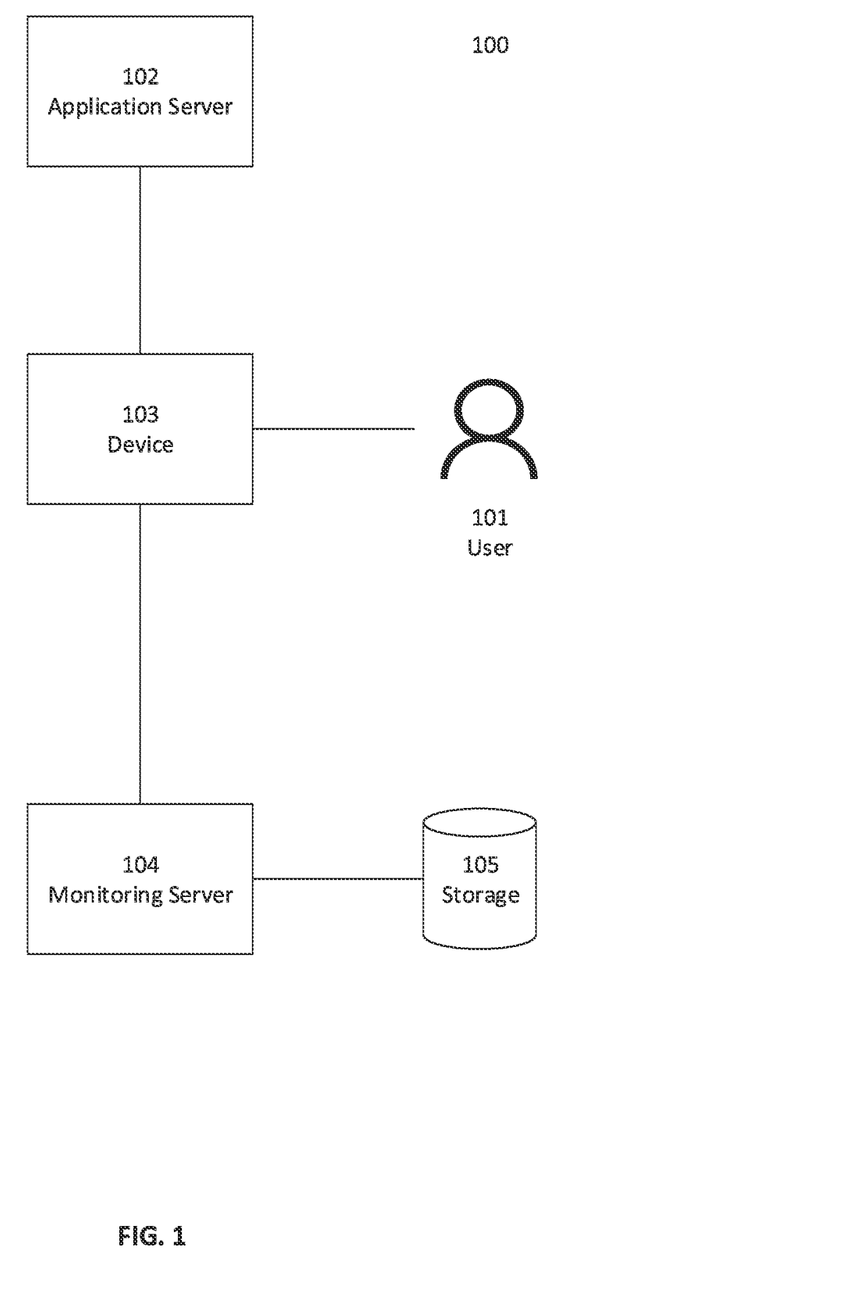
FIG. 1 is a schematic block diagram of an exemplary system, according to some embodiments of the present invention.

Reference is now made to FIG. 1, showing a schematic block diagram of an exemplary system 100 according to some embodiments of the present invention. In these embodiments, user 101 downloads and installs an application from an application server 102 to a device 103. Application server 102 optionally comprises one or more hardware processors. Device 103 optionally comprises one or more hardware processors executing code including the application. Device 103 may be a mobile device. Optionally, device 103 comprises one or more sensors for capturing one or more engagement metrics. Examples of such engagement metrics are: an amount of times the application has been downloaded to a device that can execute it, an amount of times the application has been opened by the user, an amount of time the user spent using the application per visit (dwell time), an average amount of user operations, for example clicks, per visit, an amount of times the user downloads the application after deleting it and an amount of days the application has been used. Optionally, the one or more sensors comprise one or more software objects executed by the device's one or more hardware processors. A sensor may be a counter in a software object executed by the device's one or more hardware processors.

Optionally, application server 102 comprises one or more sensors, for example one or more software objects executed by the server's one or more hardware processors, for capturing one or more engagement metrics. For example: an amount of times the application has been downloaded to a device after the application has been deleted, an amount of time between deletion of an application from the device and re-downloading the application to the same device, and an amount of times the application was downloaded by the user after an alternative application became available. A sensor may be a counter in a software object executed by the server's one or more hardware processors.

Optionally, system 100 comprises a monitoring server 104 comprising one or more hardware processors, connected to device 103. Optionally, monitoring server 104 is a server. Optionally, monitoring server 104 is a virtual machine executed by one or more hardware processors. Optionally, monitoring server is one or more software objects executed by device 102. In some embodiments, monitoring server 104 is connected to device 103 over a data communication network, for example a Local Area Network, and a Wide Area Network. The data communication network may be a wired network, for example Ethernet. The data communication network may be wireless, for example a Wireless Fidelity (WiFi) network. The data communication network may be a cellular network, for example a Code Division Multiple Access (CDMA) network and an Orthogonal Frequency Division Multiple Access (OFDMA) network. In addition, monitoring server 104 may be connected to application server 102. Optionally, monitoring server 104 is connected to application server 102 over a second data communication network, for example a Local Area Network, and a Wide Area Network. The second data communication network may be a wired network, for example Ethernet. The second data communication network may be wireless, for example a Wireless Fidelity (WiFi) network. The second data communication network may be a cellular network, for example a Code Division Multiple Access (CDMA) network and an Orthogonal Frequency Division Multiple Access (OFDMA) network.

In embodiments comprising one or more sensors, the one or more sensors capture one or more values of one or more engagement metrics. Optionally the one or more sensors send the one or more values to monitoring server 104. Optionally, monitoring server 104 processes the one or more values to produce one or more user engagement indexes, each index representing the user's engagement with the application over a time interval.

Optionally, monitoring server 104 is connected to a non-volatile digital storage 105, for storing the one or more user engagement indexes. Examples of non-volatile digital storage are a hard disk, an optical disk and a non-volatile memory chip such as an electrically erasable programmable read only memory chip. Optionally, monitoring server 104 stores the one or more values to the non-volatile digital storage. In some embodiments, device 103 is connected to non-volatile digital storage 105 and stores the one or more values in the storage. Optionally, monitoring server 104 reads the values from the storage.

To produce the one or more user engagement indexes, system 100 optionally implements the following method.

Henceforth, the term "engagement metric" means "user engagement metric".

Figure 2:
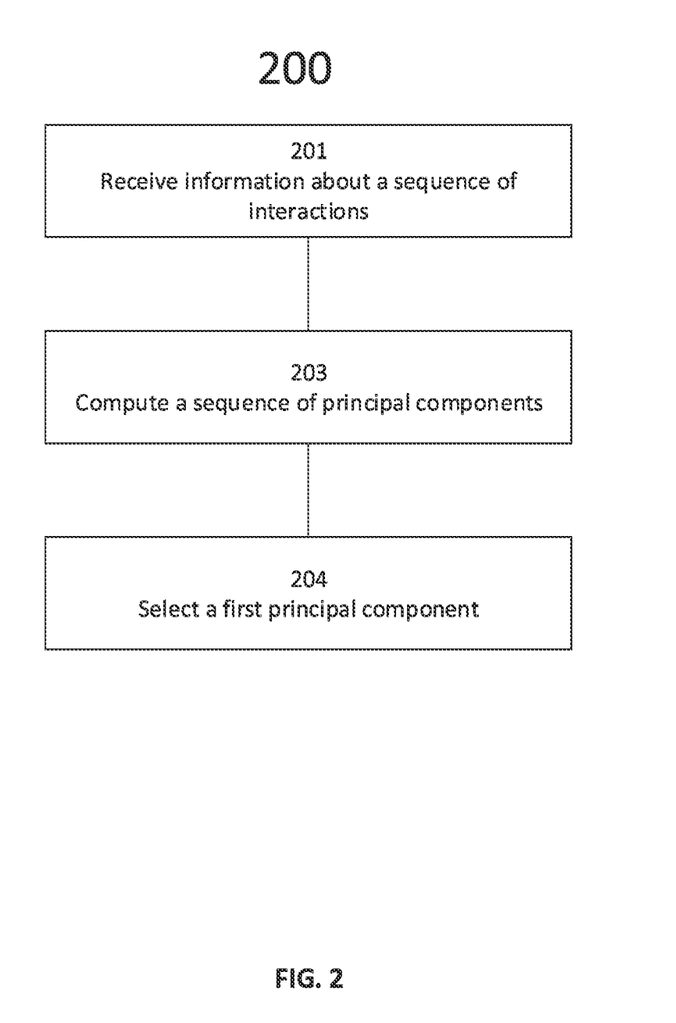
FIG. 2 is a flowchart schematically representing an optional flow of operations for producing a user engagement index, according to some embodiments of the present invention.

Reference is now made also to FIG. 2, showing a flowchart schematically representing an optional flow of operations 200 for producing a user engagement index, according to some embodiments of the present invention. In these embodiments, monitoring server 104 receives at 201, from one or more sensors of at least one of device 103 and software server 102, information about a sequence of interactions of user 101 with a software application executed on device 103 during a time interval. The information optionally comprises for each interaction of the sequence of interactions, a plurality of values of a plurality of engagement metrics. In 203 monitoring server 104 optionally computes a sequence of linearly uncorrelated principal components based on the outcome of performing PCA of the plurality of values of the plurality of engagement metrics, and in 204 monitoring server 104 optionally selects a first component from the sequence of linearly uncorrelated principal components to be a user engagement index, representing the user's engagement with the application during the time interval according to the plurality of engagement metrics.

Details of a possible method for computing the sequence of linearly uncorrelated principal components and selecting the first principal component are described in the following optional method.

Figure 3:
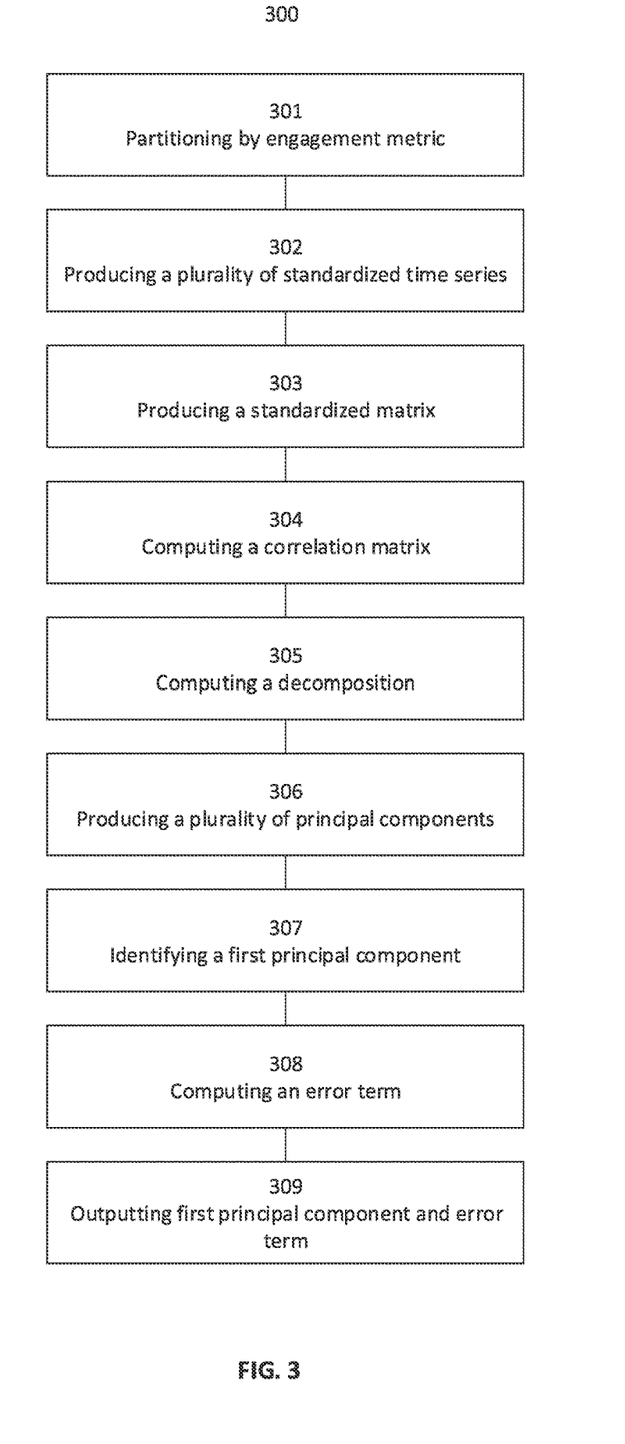
FIG. 3 is a flowchart schematically representing an optional flow of operations for applying PCA, according to some embodiments of the present invention.

Reference is now made also to FIG. 3, showing a flowchart schematically representing an optional flow of operations 300 for applying PCA according to some embodiments of the present invention. In such embodiments, each of the user interactions is associated with a time. Optionally, to compute the plurality of principal components, monitoring server 104 produces a standardized matrix representing the set of values by first partitioning in 301 the plurality of values according to engagement metric to produce a plurality of time series. Each value may be associated with the time of its user interaction. Each of the time series optionally comprises a sequence of all values of one of the plurality of engagement metrics, in ascending order of time associated with each of the sequence of values. In 302, the monitoring server optionally produces a plurality of standardized time series, by standardizing each of the plurality of time series to a zero mean and unit standard deviation. In 303, the monitoring server optionally produces a standardized matrix composed of the plurality of standardized time series, such that each of the standardized tie series is a row of the standardized matrix. The standardized matrix may be depicted by $Y_r$. Next, the monitoring server optionally computes in 304 a correlation matrix, depicted by A, for $Y_r$. In 305, the monitoring server optionally computes a decomposition of A. As described above, decomposing A results in a diagonal matrix of a plurality of eigenvalues in descending order, depicted by $\Lambda$, and an orthonormal matrix of a plurality of eigenvector basis, depicted by $\Gamma$. In $\Gamma$, each $i^{th}$ column is A's $i^{th}$ eigenvector, depicted by $\gamma_i$.

Next, in 306, the monitoring server optionally computes for each eigenvector basis $\gamma_i$ a linear combination of a plurality of metric coefficients by multiplying the inverse of $\gamma_i$ by $Y_r$, to produce a plurality of principal components. $\alpha_{i,t}$ depicts the linear combination for $\gamma_i$. In 307, the monitoring server optionally identifies a first principal component $\alpha_{1,t}$. Because the diagonal of A is in descending order, $\alpha_{1,t}$=MAX $(\alpha_{i,t})$. Optionally, in 308, the monitoring server computes an error term, depicted by err, to satisfy the equation $Y_r=\gamma_{1,t}$+ err, and in 309 outputs $\alpha_{1,t}$ and err.

To identify changes in a user's engagement with an application, there may be a need to continuously compute one or more user engagement indexes, for comparison. Optionally, system 100 implements the following method to continuously compute one or more additional user engagement indexes.

Figure 4:
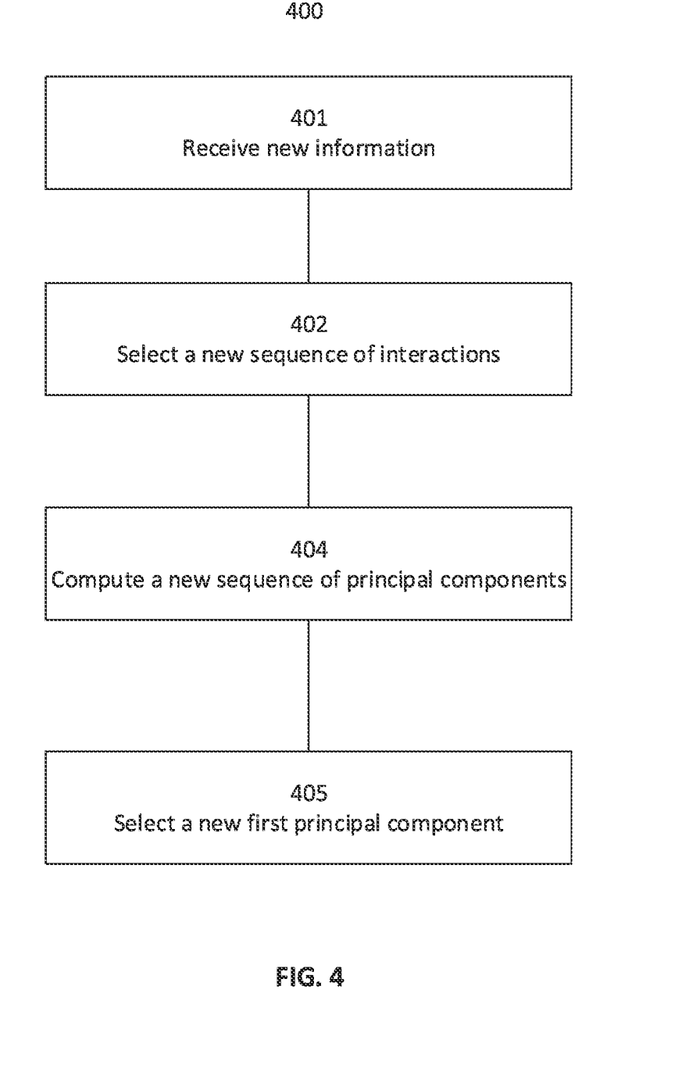
FIG. 4 is a flowchart schematically representing an optional flow of operations for continuously producing user engagement indexes, according to some embodiments of the present invention.

Reference is now also made to FIG. 4, showing a flowchart schematically representing an optional flow of operations 400 for continuously producing user engagement indexes, according to some embodiments of the present invention. In such embodiments, each of the user engagement indexes is computed for a predefined recent time interval. For example, a user engagement index may be computed for the past 1 hour. Another example is computing a user engagement index for the past 1 day. Optionally, monitoring server 104 receives, in 401, new information from the one or more sensors about at least one new interaction of the user with the application. Optionally, the information comprises a plurality of new values of the plurality of engagement metrics. In 402 the monitoring server optionally selects a new sequence of interactions associated with the predefined recent time interval, from the information about the plurality of interactions and the new information about the new one or more interactions. Next the monitoring server optionally computes, in 404, a new sequence of linearly uncorrelated principal components based on the outcome of performing PCA of the plurality of values of the plurality of engagement metrics of the new sequence of interactions, and in 405 the monitoring server optionally selects a new first component from the new sequence of linearly uncorrelated principal components to be a new user engagement index.

The present invention, in some embodiments thereof, enables a machine to identify a trend in the user's engagement with the application. If the user's engagement with the application is constant, over time the plurality of metric coefficients composing the user engagement index are expected to display random fluctuation. However, if there is a definite change in the user's engagement with the application, the plurality of metric coefficients composing the user engagement index are expected to display an identifiable trend. To determine such a trend, system 100 may implement the following optional method.

Figure 5:
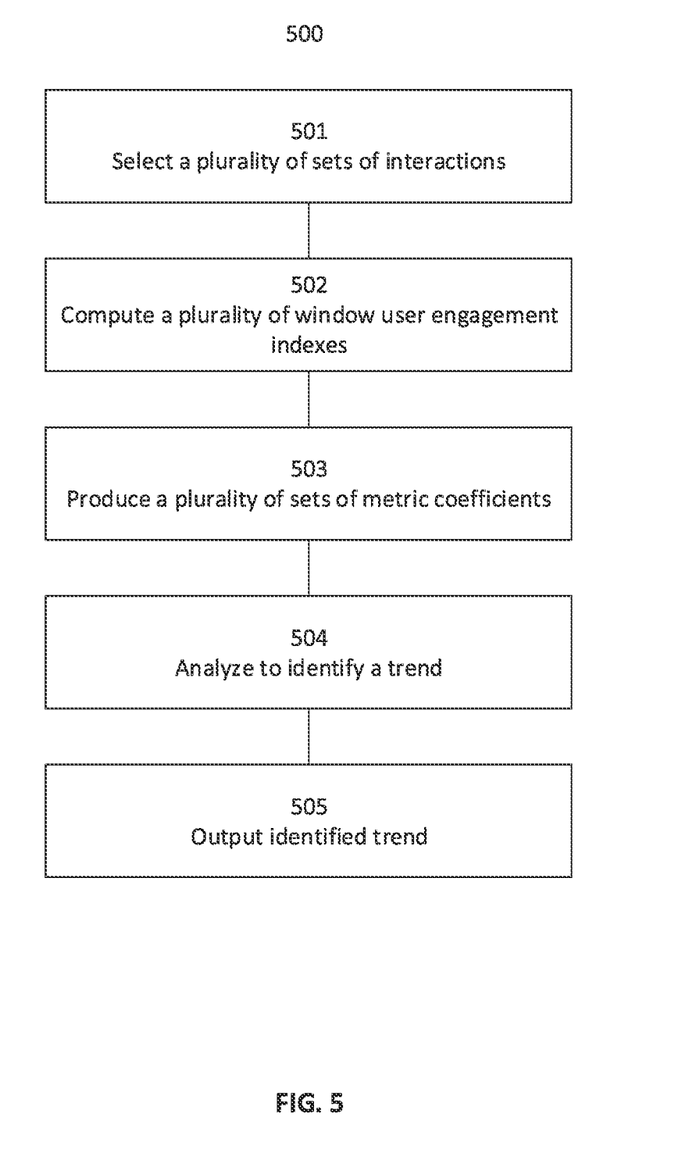
FIG. 5 is a flowchart schematically representing an optional flow of operations for identifying a trend in user engagement, according to some embodiments of the present invention.

Reference is now made also to FIG. 5, showing a flowchart schematically representing an optional flow of operations 500 for identifying a trend in user engagement, according to some embodiments of the present invention. In such embodiments, to check the stability of the plurality of metric coefficients over time, the plurality of metric coefficients are computed using a rolling window of an identified amount of time. Optionally, in 501, monitoring server 104 selects from the sequence of interactions a plurality of sets of interactions, or windows of interactions, where each set of interactions consists of a consecutive sequence of interactions from the sequence of interactions. Each consecutive sequence of interactions is associated with a window of time within the time interval of the sequence of interactions. The length of the window of time is the identified amount of time. Some of the plurality of sets of interactions may overlap each other. For example, two of the plurality of sets of interactions may be shifted one from the other by one interaction. In 502, the monitoring server optionally computes a plurality of window user engagement indexes. Each of the window user engagement indexes is a user engagement index for one of the plurality of sets of interactions. For each of the plurality of sets of interactions, the monitoring server optionally computes for each set of the plurality set of interactions a sequence of uncorrelated window principle components based on the outcome of performing PCA of the plurality of values of the plurality of engagement metrics of the set, and selects a first component from the sequence of window principle components as the window user engagement index. As described above, according to PCA each of the window user engagement indexes is a linear combination of a plurality of metric coefficients. In 503, the monitoring server optionally produces a plurality of sets of metric coefficients, each set comprising the plurality of metric coefficients composing one of the window user engagement indexes. Optionally, in 504 the monitoring server analyzes the plurality of sets of metric coefficients to identify a trend, and may output the identified trend in 505.

Figure 6:
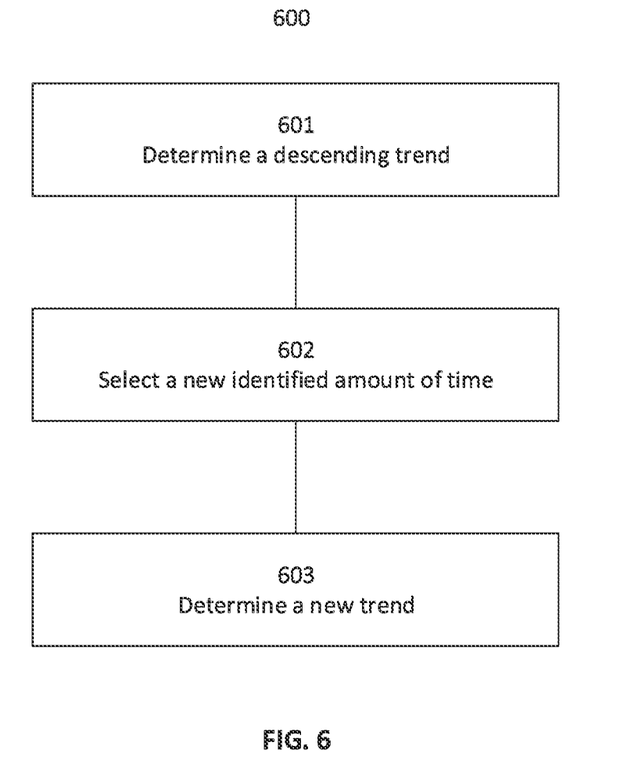
FIG. 6 is a flowchart schematically representing an additional optional flow of operations for identifying a trend in user engagement, according to some embodiments of the present invention.

Optionally, the monitoring server applies a predefined test to the identified trend to determine whether the trend is decreasing or not. For example, the monitoring server may compute for each of the plurality of metric coefficients a moving average value. When a value of an identified metric coefficient is above the moving average value of the identified metric coefficient a positive trend may be determined, whereas a trend may be determined negative when a value of the identified metric coefficient is below the moving average value of the identified metric coefficient. However, the identified amount of time used for selecting the plurality of sets of interactions may affect the ability to identify a decreasing trend, for example due to large sampling error. In some embodiments of the present invention the method for identifying a trend in user engagement is repeated using a different, smaller, identified amount of time. Reference is now made also to FIG. 6, showing a flowchart schematically representing an additional optional flow of operations 600 for identifying a trend in user engagement, according to some embodiments of the present invention. In such embodiments, after determining in 601 that an identified trend is not a descending trend, subject to the identified trend not complying with a predefined test, in 602 monitoring server 104 selects a new identified amount of time less than the identified amount of time and no less than a cutoff amount of time. In 603, the monitoring server optionally determines a new trend using the new identified amount of time. This optionally repeats the method described in FIG. 5, using shorter time windows for the plurality of sets of interactions. This method may be repeated, until either a descending trend is identified or until the new identified amount of time equals the cutoff amount of time.

When a descending trend is identified, monitoring server 104 may notify a developer of distributer of the application, for the purpose of taking steps to preserve user engagement, for example changing the application's graphical user interface, improving the application's response time and changing the way the application presents advertisements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant user engagement metrics will be developed and the scope of the term "user engagement metric" is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for monitoring user engagement with computer applications, the system having a simplified engagement analysis capabilities and reduced computation complexity and is capable of accessing a plurality of sensors measuring user engagement activities, the system comprising:

at least one hardware processor, configured to:

receive from the plurality of sensors information about a sequence of interactions of a user with a software application during a time interval, said information comprising, for each of said sequence of interactions, a plurality of sensor output values of a plurality of engagement metrics reflecting said user's emotional attachment to said software application;

compute a sequence of linearly uncorrelated principle components based on an outcome of principal component analysis (PCA) of said plurality of sensor output values of said plurality of engagement metrics;

select a first component from said sequence of linearly uncorrelated principle components to represent a trend of engagement of said user with said application during said time interval according to said plurality of engagement metrics; and change a user interface of the software application according to the trend.

2. The system of claim 1, wherein said at least one hardware processor is further configured to:

receive from said plurality of sensors new information about a new interaction of said user with said software application, said new information comprising a plurality of new sensor output values of said plurality of engagement metrics;

select from said information and said new information a new sequence of interactions associated with a predefined recent time interval;

compute a new sequence of linearly uncorrelated principle components based on an outcome of PCA of said plurality of sensor output values of said plurality of engagement metrics in said new sequence of interactions; and select a new first component from said new sequence of linearly uncorrelated principle components to be a new user engagement index.

3. The system of claim 1, wherein said plurality of engagement metrics comprises a member selected from a group consisting of: an amount of application downloads, an amount of application opened by a user, an amount of time a user spent on an application in a visit, an amount of user operations in a visit, an amount of application downloads after application removal and an amount of days an application is used.

4. The system of claim 3, wherein said user operations include a click on a location of an application's user interface.

5. The system of claim 1, wherein each of said plurality of interactions is associated with a time; and
wherein said at least one hardware processor is configured to compute said plurality of linearly uncorrelated principle components by:
producing a standardized matrix of said plurality of sensor output values from all of said plurality of interactions;
computing a correlation matrix for said standardized matrix;
computing a spectral decomposition of said correlation matrix producing an eigenvector matrix and an eigenvalue matrix, such that the correlation matrix equals a product of said eigenvector matrix with a diagonal matrix consisting of a plurality of eigenvalues of said eigenvalue matrix in descending order of value and an inverse matrix of said eigenvector matrix; and
producing said sequence of linearly uncorrelated principle components by computing for each eigenvector in said eigenvector matrix a linear combination of a plurality of metric coefficients, by multiplying the inverse of said eigenvector by said standardized matrix.

6. The system of claim 5, wherein said trend is computed by:
identifying in said sequence of principal components said first component;
computing an error term by subtracting a product of a first eigenvector of said eigenvector matrix and said first component from said standardized matrix; and
outputting said first component and said error term.

7. The system of claim 5, wherein said producing a standardized matrix comprises:
partitioning by engagement metric all of said plurality of sensor output values from all of said sequence of interactions to produce a plurality of time series, by producing for each metric of said plurality of engagement metrics a sequence of sensor output values of said metric in ascending time associated with said sequence of interactions;
producing a plurality of standardized time series by standardizing each of said plurality of time series to a zero mean and unit standard deviation; and
producing a standardized matrix composed of said plurality of standardized time series, such that each of said standardized time series is a row of said standardized matrix.

8. The system of claim 5, wherein said at least one hardware processor is further configured to determine the trend using an identified amount of time by:
selecting from said sequence of interactions a plurality of sets of interactions, each of said sets consisting of a consecutive sequence of interactions associated with a window of time within said time interval, said window of time having a length of said identified amount of time;
computing a plurality of window user engagement indexes, comprising for each set of said sets of interactions:
computing a sequence of linearly uncorrelated window principle components based on an outcome of PCA of said plurality of sensor output values of said plurality of engagement metrics in said set of interactions; and
selecting a first component from said sequence of linearly uncorrelated window principle components to be a window user engagement index;
producing a plurality of sets of metric coefficients, comprising for each of said window user engagement indexes said window user engagement index's plurality of metric coefficients;
analyzing said plurality of sets of metric coefficients to identify a trend; and
outputting said identified trend.

9. The system of claim 8, wherein said at least one hardware processor is further configured to:
determine lack of a descending trend, subject to said identified trend failing to comply with a predefined test;
select a new identified amount of time, said new identified amount of time less than said identified amount of time and no less than a predefined cutoff amount of time; and
determine a new trend using said new identified amount of time.

10. The system of claim 8, wherein said at least one hardware processor is further configured to store said plurality of window user engagement indexes in a non-volatile digital storage connected to said at least one hardware processor.

11. The system of claim 1, wherein said plurality of sensors comprises at least one software object executed by said at least one hardware processor.

12. The system of claim 11, wherein at least one object of said at least one software object is executed in the device executing the application; and
wherein said at least one object comprises one or more counters for counting some of said plurality of engagement metrics.

13. The system of claim 1, wherein said user downloads said software application to a device from an application server comprising at least one other hardware processor; and
wherein said plurality of sensors comprises at least one software object executed by said application server.

14. The system of claim 13, wherein at least one object of said at least one software object comprises one or more counters for counting some of said plurality of engagement metrics.

15. The system of claim 1, wherein said at least one hardware processor is a server or a virtual machine.

16. The system of claim 1, wherein said at least one hardware processor is a client device executing said application.

17. A method for estimating user engagement with computer applications, using a simplified engagement analysis and reduced computation complexity based on accessing a plurality of sensors measuring user engagement activities, comprising:

receiving from said plurality of sensors information about a sequence of interactions of a user with a software application during a time interval, said information comprising, for each of said sequence of interactions, a plurality of sensor output values of a plurality of engagement metrics reflecting said user's emotional attachment to said software application;

computing a sequence of linearly uncorrelated principle components based on an outcome of PCA of said plurality of sensor output values of said plurality of engagement metrics;

selecting a first component from said sequence of linearly uncorrelated principle components to be a trend representing an engagement of said user with said application during said time interval according to said plurality of engagement metrics; and     changing a user interface of the software application according to the trend.

\* \* \* \* \*